US009563196B2

(12) United States Patent
Liu

(10) Patent No.: US 9,563,196 B2
(45) Date of Patent: Feb. 7, 2017

(54) PRODUCTION LINE SYSTEM AND CONTROLLING METHOD THEREOF

(71) Applicant: Shenzhen China Star Optoelectronics Technology Co., Ltd., Shenzhen, Guangdong (CN)

(72) Inventor: Tao Liu, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 795 days.

(21) Appl. No.: 14/004,929

(22) PCT Filed: Jul. 18, 2013

(86) PCT No.: PCT/CN2013/079612
§ 371 (c)(1),
(2) Date: Sep. 13, 2013

(87) PCT Pub. No.: WO2015/006960
PCT Pub. Date: Jan. 22, 2015

(65) Prior Publication Data
US 2015/0025669 A1 Jan. 22, 2015

(30) Foreign Application Priority Data

Jul. 17, 2013 (CN) .......................... 2013 1 0300259

(51) Int. Cl.
*G06F 19/00* (2011.01)
*G05B 19/418* (2006.01)

(52) U.S. Cl.
CPC ....... *G05B 19/4182* (2013.01); *G05B 19/4183* (2013.01); *G05B 2219/31304* (2013.01); *Y02P 90/10* (2015.11); *Y02P 90/28* (2015.11)

(58) Field of Classification Search
CPC ............ G05B 19/4182; G05B 19/4183; G05B 2219/13104; Y02P 90/10; Y02P 90/28
(Continued)

(56) References Cited

U.S. PATENT DOCUMENTS 5,088,045 A * 2/1992 Shimanaka ...... G05B 19/41835
700/110
5,150,288 A * 9/1992 Imai .................... G05B 19/4183
700/112

(Continued)

FOREIGN PATENT DOCUMENTS

| CN | 1520354 A | 8/2004 |
| CN | 101966500 A | 2/2011 |
| CN | 102654767 A | 9/2012 |

OTHER PUBLICATIONS

Browne, Jim, et al. "Classification of flexible manufacturing systems." The FMS magazine 2.2 (1984): pp. 114-117.*

(Continued)

Primary Examiner — Satish Rampuria
(74) Attorney, Agent, or Firm — Andrew C. Cheng

(57) ABSTRACT

A production line system includes n operational stations $L_1$, $L_2$, $L_3$ ... $L_n$. Each operational station includes: m operational devices $D_{n1}$, $D_{n2}$, $D_{n3}$ ... $D_{nm}$ in each operational station, and the operational devices used for processing operated products with m specifications, respectively, in which n=1, 2, 3, ... n and m≥1. An initial terminal of the production line system comprises a signal analyzer and a transport mechanism. The signal analyzer is used for analyzing product information of an operated product and for demanding the transport mechanism to deliver the operated product to a corresponding initial operational station and a corresponding operational device according to the product information The production line system provided can deal with products with more than two different specifications at (Continued)

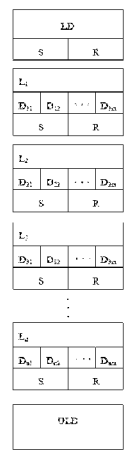

the same time, and especially can apply to producing a small number of products or an experimental batch of products. The production line system has advantages of saving production time of a small number of products, effectively utilizing devices on the production line, improving production efficiency, and reducing production cost.

10 Claims, 1 Drawing Sheet

(58) Field of Classification Search
USPC .................................................. 700/95–129
See application file for complete search history.

(56) References Cited

U.S. PATENT DOCUMENTS

| | | | | |
|---|---|---|---|---|
| 5,303,147 A | * | 4/1994 | Oba | G06Q 10/0631 700/97 |
| 5,321,619 A | * | 6/1994 | Matsuda | B62D 65/005 235/375 |
| 5,434,790 A | * | 7/1995 | Saka | G05B 19/4183 700/110 |
| 2003/0102367 A1 | * | 6/2003 | Monette | G05B 19/4183 235/376 |
| 2010/0179676 A1 | * | 7/2010 | Alessandria | A23G 1/205 700/99 |

OTHER PUBLICATIONS

Rekiek, Brahim, et al. "State of art of optimization methods for assembly line design." Annual Reviews in control 26.2 (2002): pp. 163-174.*

Mahalik, N. G. P. C., and S. K. Lee. "A study on production line automation with LonWorks™ control networks." Computer Standards & Interfaces 24.1 (2002): pp. 21-27.*

* cited by examiner

| LD |
|---|
| S | R |

| $L_1$ | | | |
|---|---|---|---|
| $D_{11}$ | $D_{12}$ | $\cdots$ | $D_{1m}$ |
| S | | R | |

| $L_2$ | | | |
|---|---|---|---|
| $D_{21}$ | $D_{22}$ | $\cdots$ | $D_{2m}$ |
| S | | R | |

| $L_3$ | | | |
|---|---|---|---|
| $D_{31}$ | $D_{32}$ | $\cdots$ | $D_{3m}$ |
| S | | R | |

⋮

| $L_n$ | | | |
|---|---|---|---|
| $D_{n1}$ | $D_{n2}$ | $\cdots$ | $D_{nm}$ |
| S | | R | |

| ULD |
|---|

PRODUCTION LINE SYSTEM AND CONTROLLING METHOD THEREOF

BACKGROUND OF THE INVENTION

1. Field of the Invention

The present invention relates to a production line and a controlling method thereof, and more particularly, to a production line capable of dealing with products with more than two different specifications at the same time and a controlling method thereof.

2. Description of the Prior Art

A production line is a mechanical system in which operating workers or industrial robots are allocated. A production line is also an operational line in which a determined production procedure is finished step by step. The process route and processing laboring ratio of major products or of most of products on the production line determine the number of the mechanical device which is necessary for finishing processing some sorts of products on the production line, the disposition of the mechanical device, the arrangement of the operational place, etc.

The production line system is frequently used in the conventional production industry. However, it is only possible to produce products with the same specification in the same period of time on the same production line. The production line has to be cleared up completely when a small number of products need producing. Besides, a small scale of experimental batches need producing before a large number of products are produced or the manufacturing process is improved. At this time, the production line has to be cleared up completely as well. After the production line is cleared up completely, the production starts, which is a waste of time. Especially, the conventional production line greatly affects capacity and cost of sophisticated and difficult industries such as the TFT-LCD (Thin Film Transistor Liquid Crystal Display) industry. It is harder to control the manufacturing process of the sophisticated and difficult industries, or the abnormality of the manufacturing process of the sophisticated and difficult industries frequently occurs, so engineers often try to produce a small scale of experimental batches before improving the manufacturing process.

SUMMARY OF THE INVENTION

Due to inadequate capability of the conventional technology, an object of the present invention is to provide a production line system for dealing with products with more than two different specifications at the same time. The production line system especially applies to producing a small number of products or an experimental batch of products. The production line system has advantages of saving production time of a small number of products, effectively utilizing devices on the production line, and reducing production cost.

According to the present invention, a production line system comprises n operational stations $L_1, L_2, L_3 \ldots L_n$; m operational devices $D_{n1}, D_{n2}, D_{n3} \ldots D_{nm}$ in each operational station, and the operational devices used for processing operated products with m specifications, respectively, in which $n=1, 2, 3, \ldots n$ and $m \geq 1$; an initial terminal of the production line system comprising a signal analyzer and a transport mechanism, the signal analyzer used for analyzing product information of an operated product and for demanding the transport mechanism to deliver the operated product to a corresponding initial operational station and a corresponding operational device according to the product information; each of the operational stations comprising a signal analyzer and a transport mechanism, the signal analyzer used for analyzing the product information of the operated product in the operational station and for demanding the transport mechanism to deliver a product needing operating to a corresponding next operational station and a corresponding operational device according to the product information.

Furthermore, the operated product comprises identification information, the identification information of the operated product is a two-dimensional barcode or a barcode, the signal analyzer is connected to a readable device for the two-dimensional barcode or the barcode, and the identification information read by the readable device is delivered to the signal analyzer for analysis.

Furthermore, the operated product comprises identification information, the identification information is an RFID (radio frequency identification) electronic label, the signal analyzer is connected to a readable device for the RFID electronic label, and the readable device delivers the identification information read by the readable device to the signal analyzer for analysis.

Furthermore, the signal analyzer is either a Personal Computer (PC) or a PLC (programmable logic controller).

Furthermore, each of the operational stations comprises a transport mechanism, and the transport mechanism delivers products with different specifications to a following operational station in order according to the product information.

Furthermore, each of the operational stations comprises a plurality of transport equipments, and the plurality of transport equipments deliver a plurality of products with different specifications at the same time.

Furthermore, the transport equipment is a robot arm.

Furthermore, some operational devices have functions of identifying product information and automatically switching operational parameters so that products with different specifications can be operated by the same operational device.

Furthermore, the production line system further comprises a main controlling system, the main controlling system is connected to each of the signal analyzer, and the main controlling system is used for setting an operational procedure of the operated product and transmitting the operational information to the each of the signal analyzer.

According to the present invention, a controlling method for a production line system comprises n operational stations $L_1, L_2, L_3 \ldots L_n$. Each of the n operational stations comprises m operational devices $D_{n1}, D_{n2}, D_{n3} \ldots D_{nm}$, the operational devices are used for processing operated products with m specifications, respectively, in which $n=1, 2, 3, \ldots n$ and $m \geq 1$. An initial terminal of the production line system comprises a signal analyzer and a transport mechanism. Each of the operational stations comprises a signal analyzer and a transport mechanism. The method comprises: S1: an operated product being put on the initial terminal of the production line system, and then the signal analyzer of the initial terminal analyzing product information of the operated product; S2: the signal analyzer of the initial terminal demanding the transport mechanism of the initial terminal to deliver the operated product to a corresponding initial operational station and a corresponding operational device for operation according to the product information; S3: the signal analyzer of the each of the operational stations analyzing the product information of the operated product which has been operated in the operational station and then demanding the transport mechanism of the each of the operational stations to deliver the operated product to a corresponding next operational station and a corresponding device according to the product information until the end of the manufacturing process of the operated product.

Furthermore, the production line system further comprises a main controlling system which is connected to each of the signal analyzers, and is used for setting an operational procedure of the operated product and transmitting the information about the operational procedure to the each of the signal analyzers.

Furthermore, the operated product comprises identification information, the identification information of the operated product is a two-dimensional barcode or a barcode, the signal analyzer is connected to a readable device for the two-dimensional barcode or the barcode, and the identification information read by the readable device is delivered to the signal analyzer for analysis.

Furthermore, the operated product comprises identification information, the identification information is an RFID (radio frequency identification) electronic label, the signal analyzer is connected to a readable device for the RFID electronic label, and the readable device delivers the identification information read by the readable device to the signal analyzer for analysis.

Furthermore, the signal analyzer is either a Personal Computer (PC) or a PLC (programmable logic controller).

Furthermore, each of the operational stations comprises a transport mechanism, and the transport mechanism delivers products with different specifications to a following operational station in order according to the product information.

Furthermore, each of the operational stations comprises a plurality of transport equipments, and the plurality of transport equipments deliver a plurality of products with different specifications at the same time.

Furthermore, the transport equipment is a robot arm.

Furthermore, some operational devices have functions of identifying product information and automatically switching operational parameters so that products with different specifications can be operated by the same operational device.

The production line system proposed by the present invention can deal with products with more than two different specifications at the same time, and especially can apply to producing a small number of products or an experimental batch of products. The production line system has advantages of saving production time of a small number of products, effectively utilizing devices on the production line, improving production efficiency, and reducing production cost.

BRIEF DESCRIPTION OF THE DRAWINGS

FIG. 1 shows a production line system according to a preferred embodiment of the present invention.

DETAILED DESCRIPTION OF THE PREFERRED EMBODIMENTS

The accompanying drawings illustrate embodiments of the invention and, together with the description, serve to explain the principles of the invention.

Please refer to FIG. 1 showing a production line system according to a preferred embodiment of the present invention. The production line system comprises n operational stations $L_1, L_2, L_3 \ldots L_n$. Each of the operational stations comprises m operational devices $D_{n1}, D_{n2}, D_{n3} \ldots D_{nm}$, and the operational devices are used for processing operated products with m specifications, respectively, in which n=1, 2, 3, . . . n and m≥1. An initial terminal LD of the production line system comprises a signal analyzer S and a transport mechanism R. The signal analyzer S is used for analyzing product information of operated products and for demanding the transport mechanism R to deliver the operated products to their corresponding initial operational station and their corresponding operational device according to the product information.

Each of the operational stations L comprises a signal analyzer S and a transport mechanism R. The signal analyzer S is used for analyzing product information of operated products in the operational station and for demanding the transport mechanism R to deliver products needing operating to their corresponding next operational station and their corresponding operational device for operation according to the product information.

All of the operated products comprise identification information. The identification information is an RFID (radio frequency identification) electronic label. The signal analyzer S is connected to a readable device comprising the RFD electronic label (not shown). The readable device transmits the identification information which has been read by the readable device to the signal analyzer S for analysis. The signal analyzer S can be a Personal Computer (PC) or a PLC (programmable logic controller).

In some preferred embodiments, the identification information of the operated product is a two-dimensional barcode or a barcode. The signal analyzer S is connected to a readable device for the two-dimensional barcode or the barcode. The identification information which has been read by the readable device is transmitted to the signal analyzer S for analysis.

Each of the operational stations L comprises a plurality of transport equipments in this embodiment. The plurality of transport equipments can deliver a plurality of products with different specifications at the same time. Each of the plurality of transport equipments is a robot arm.

In some preferred embodiments, some operational devices have functions of identifying product information and automatically switching operational parameters so that products with different specifications can be operated by the same operational device.

In some preferred embodiments, the production line system further comprises a main controlling system (not shown). The main controlling system is connected to each of the signal analyzers S. The main controlling system is used for setting the operational procedure of the operated product and transmitting information about the operational procedure to the each of the signal analyzers S.

How an A product with one specification and a B product with another one specification are produced at the same time on the production line system provided by the present invention is elaborated in the following.

The operational procedure of the A product is $L_1/D_{11}$, $L_2/D_{21}$, $L_3/D_{31}$, $L_4/D_{41}$, $L_6/D_{61}$;

the operational procedure of the B product is $L_1/D_{12}$, $L_3/D_{32}$, $L_4/D_{42}$, $L_5/D_{52}$, $L_7/D_{72}$;

where $L_1/D_{11}$ denotes an operational device $D_{11}$ in the $L_1$ operational station, and so forth.

To begin with, the information about the operational procedure of the A product and the B product is set in the main controlling system. Then, the main controlling system transmits the information about the operational procedure to each of the signal analyzers S.

Subsequently, the A product and the B product are delivered to the production line system from the initial terminal LD of the production line system. Then, the signal analyzer S of the initial terminal LD identifies the product information of the A product. Next, the signal analyzer S demands the transport mechanism R to deliver the A product to the operational device $D_{11}$ in the $L_1$ operational station for operation. When the signal analyzer S identifies the product information of the B product, the signal analyzer S will demand the transport mechanism R to deliver the B product to the operational device $D_{12}$ in the $L_1$ operational station for operation.

The A product is done in the $L_1$ operational station. Then, the signal analyzer S in the $L_1$ operational station identifies the product information of the A product. Next, the signal analyzer S demands the transport mechanism R to deliver the A product to the operational device $D_{21}$ in the $L_2$ operational station for operation. Similarly, the A product will be operated in the $L_3/D_{31}$, $L_4/D_{41}$, and $L_6/D_{61}$. After the procedure is done, the A product will be delivered to a final terminal ULD in the manufacturing process.

The B product is done in the $L_1$ operational station. Then, the signal analyzer S in the $L_1$ operational station identifies the product information of the B product. Next, the signal analyzer S demands the transport mechanism R to deliver the B product to the operational device $D_{32}$ in the $L_3$ operational station for operation. Similarly, the B product will be operated in the $L_4/D_{42}$, $L_5/D_{52}$, and $L_7/D_{72}$. After the procedure is done, the B product will be delivered to the final terminal ULD in the manufacturing process.

In another preferred embodiment, some of the operational devices in some of the operational stations have functions of identifying product information and automatically switching operational parameters so that products with different specifications can be operated by the same operational device. Take the operational device producing the A product and the B product at the same time for example. If the operational device $D_{41}$ in the $L_4$ operational station has functions of identifying product information and automatically switching operational parameters, the A product and the B product can be independently operated by the operational device $D_{41}$. When the A product is delivered to the operational device $D_{41}$ in the $L_4$ operational station, the operational device $D_{41}$ identifies the information of the A product and the operational device $D_{41}$ is switched to an operational parameter under which the A product is processed. Then, the A product is operated by the operational device $D_{41}$. When the B product is delivered to the operational device $D_{41}$ in the $L_4$ operational station, the operational device $D_{41}$ identifies the information of the B product and the operational device $D_{41}$ is switched to an operational parameter under which the B product is processed. Then, the B product is operated by the operational device $D_{41}$.

The production line system provided by the present invention can deal with products with more than two different specifications at the same time, and especially can apply to producing a small number of products or an experimental batch of products. The production line system has advantages of saving production time of a small number of products, effectively utilizing devices on the production line, improving production efficiency, and reducing production cost.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A production line system, comprising n operational stations $L_1, L_2, L_3 \ldots L_n$, comprising:

m operational devices $D_{n1}, D_{n2}, D_{n3} \ldots D_{nm}$ in each operational station, and the operational devices used for processing operated products with m specifications, respectively, in which n=1, 2, 3, ... n and m≥1;

an initial terminal of the production line system comprising a signal analyzer and a transport mechanism, the signal analyzer being a Personal Computer (PC) or a PLC (programmable logic controller), the signal analyzer used for analyzing product information of an operated product and for demanding the transport mechanism to deliver the operated product to a corresponding initial operational station and a corresponding operational device according to the product information;

each of the operational stations comprising a signal analyzer and a transport mechanism, the signal analyzer being a Personal Computer (PC) or a PLC (programmable logic controller), the signal analyzer used for analyzing the product information of the operated product in the operational station and for demanding the transport mechanism to deliver a product needing operating to a corresponding next operational station and a corresponding operational device according to the product information;

wherein the transport mechanism comprised in the each of the operational stations delivers a plurality of products with different specifications to a following operational station in order according to the product information, the each of the operational stations comprises a plurality of transport equipments, the plurality of transport equipments deliver the plurality of products with different specifications at the same time, and each of the plurality of transport equipments is a robot arm.

2. The production line system as claimed in claim 1, wherein the operated product comprises identification information, the identification information of the operated product is a two-dimensional barcode or a barcode, the signal analyzer is connected to a readable device for the two-dimensional barcode or the barcode, and the identification information read by the readable device is delivered to the signal analyzer for analysis.

3. The production line system as claimed in claim 1, wherein the operated product comprises identification information, the identification information is an RFID (radio frequency identification) electronic label, the signal analyzer is connected to a readable device for the RFID electronic label, and the readable device delivers the identification information read by the readable device to the signal analyzer for analysis.

4. The production line system as claimed in claim 1, wherein the production line system further comprises a main controlling system, the main controlling system is connected to each of the signal analyzers, and the main controlling system is used for setting an operational procedure of the operated product and transmitting the operational information to the each of the signal analyzers.

5. A controlling method for a production line system comprising n operational stations $L_1, L_2, L_3 \ldots L_n$, wherein each of the n operational stations comprises m operational devices $D_{n1}, D_{n2}, D_{n3} \ldots D_{mn}$, the operational devices are used for processing operated products with m specifications, respectively, in which n=1, 2, 3, ... n and m≥1, an initial terminal of the production line system comprises a signal analyzer and a transport mechanism, each of the operational stations comprises a signal analyzer and a transport mechanism, and the method comprises:

S1: an operated product being put on the initial terminal of the production line system, and then the signal analyzer of the initial terminal analyzing product information of the operated product;

S2: the signal analyzer of the initial terminal demanding the transport mechanism of the initial terminal to deliver the operated product to a corresponding initial operational station and a corresponding operational device for operation according to the product information;

S3: the signal analyzer of the each of the operational stations analyzing the product information of the operated product which has been operated in the operational station and then demanding the transport mechanism of the each of the operational stations to deliver the operated product to a corresponding next operational station and a corresponding device according to the product information until the end of the manufacturing process of the operated product, wherein the transport mechanism comprised in the each of the operational stations delivers a plurality of products with different specifications to a following operational station in order according to the product information, the each of the operational stations comprises a plurality of transport equipments, the plurality of transport equipments deliver the plurality of products with different specifications at the same time, and each of the plurality of transport equipments is a robot arm.

6. The controlling method for the production line system as claimed in claim 5, wherein the production line system further comprises a main controlling system which is connected to each of the signal analyzers, and is used for setting an operational procedure of the operated product and transmitting the information about the operational procedure to the each of the signal analyzers.

7. The controlling method for the production line system as claimed in claim 5, wherein the operated product comprises identification information, the identification information of the operated product is a two-dimensional barcode or a barcode, the signal analyzer is connected to a readable device for the two-dimensional barcode or the barcode, and the identification information read by the readable device is delivered to the signal analyzer for analysis.

8. The controlling method for the production line system as claimed in claim 5, wherein the operational product comprises identification information, the identification information is an RFID (radio frequency identification) electronic label, the signal analyzer is connected to a readable device for the RFID electronic label, and the readable device delivers the identification information read by the readable device to the signal analyzer for analysis.

9. The controlling method for the production line system as claimed in claim 7, wherein the signal analyzer is either a Personal computer (PC) or a PLC (programmable logic controller).

10. The controlling method for the production line system as claimed in claim 8, wherein the signal analyzer is either a Personal Computer (PC) or a PLC (programmable logic controller).

\* \* \* \* \*